United States Patent Office 3,322,041
Patented May 30, 1967

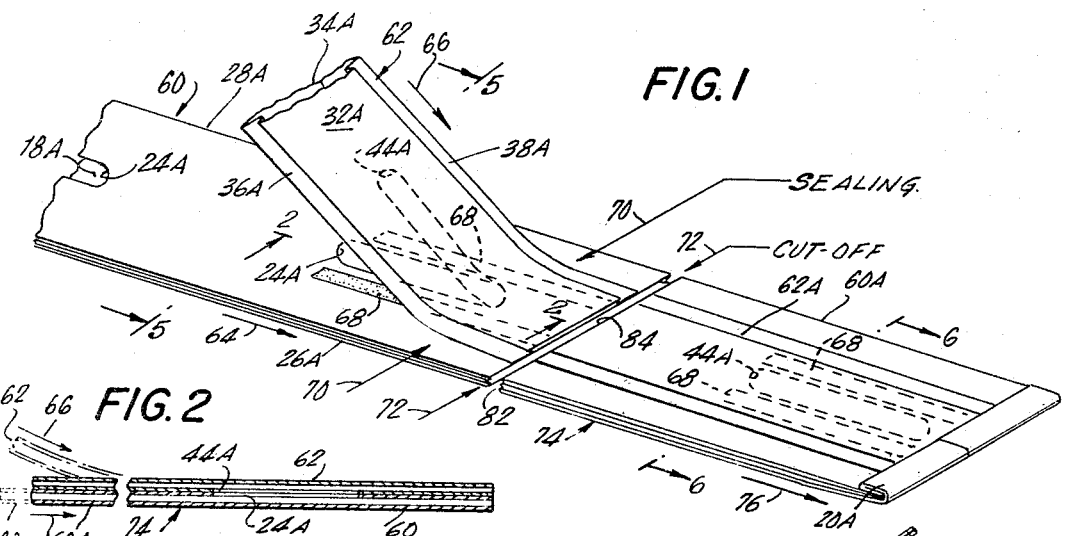
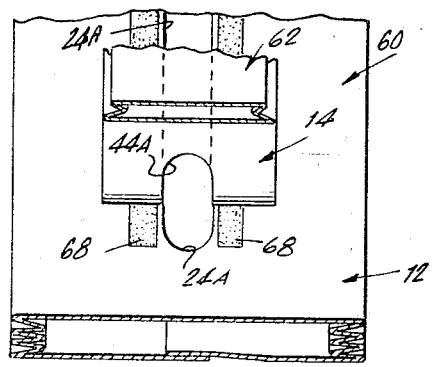
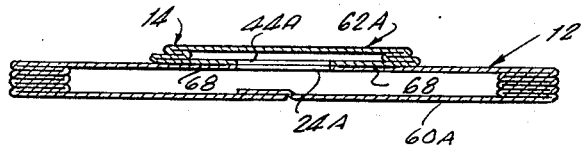
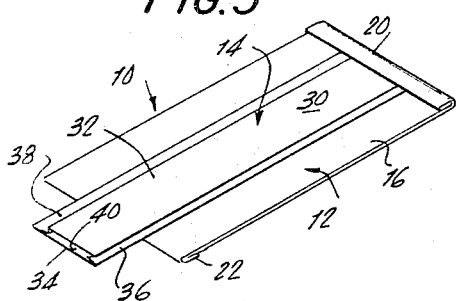
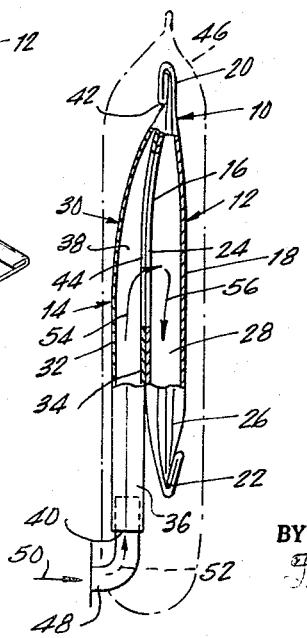

3,322,041
METHOD OF MANUFACTURING VACUUM CLEANER FILTER BAGS
John J. Fesco, Baldwin, N.Y., assignor to Studley Paper Company, Inc., a corporation of New York
Filed Nov. 12, 1964, Ser. No. 410,625
6 Claims. (Cl. 93—35)

This invention relates to a method for manufacturing vacuum cleaner filter bags of the type which is provided with an air inlet tunnel or passageway through which dirt laden air travels from the outlet end of the air intake conduit of the vacuum cleaner to the interior of the filter bag.

It is an object of the present invention to provide a highly novel and efficient method for manufacturing vacuum cleaner filter bags of the type which are provided with a main dust collecting chamber and which have provided thereon a separate passageway or tunnel through which the dust laden air is carried from the outlet end of the vacuum cleaner air intake conduit to the interior of the filter bag.

It is another object of the present invention to provide such a method which will decrease the cost of manufacture of such vacuum cleaner filter bags which are of the expendable type so that such bags can be sold at a cost which is low enough to provide for the frequent change and discarding thereof as they fill up with dust and other dirt taken in by the vacuum cleaner.

Other and further objects and advantages of the present invention will be readily apparent to one skilled in the art from a consideration of the following specification taken in connection with the appended drawing which illustrates the best mode presently contemplated for carrying out the invention.

In the drawings:

FIGURE 1 is a more or less diagrammatic illustration of the method for forming or manufacturing a vacuum cleaner filter bag pursuant to the present invention;

FIGURE 2 is a fragmentary sectional view on an enlarged scale taken on the line 2—2 of FIG. 1;

FIGURE 3 is a fragmentary sectional view similar to FIG. 2 and illustrates the step of forming one closed end of the filter bag;

FIGURE 4 is a fragmentary sectional view similar to FIG. 2 and illustrates a second step in the formation of the vacuum tube filter bag;

FIGURE 5 is a sectional view on an enlarged scale taken on the line 5—5 of FIG. 1;

FIGURE 6 is a sectional view on an enlarged scale taken on the line 6—6 of FIG. 1;

FIGURE 7 illustrates a vacuum cleaner filter bag of the type produced by the present invention; and FIGURE 8 is a more or less diagrammatic view partially in section, and illustrates the filter bag in use in a vacuum cleaner.

Referring now to the drawings in detail, FIGS. 7 and 8 illustrate a vacuum cleaner filter bag 10 produced in accordance with the method of the present invention. As here shown, the filter bag 10 comprises a bag body 12 which is provided with an air inlet tunnel or passageway 14. The bag body 12 is essentially in the form of a tube having a front wall 16, a rear wall 18, and the closed ends 20 and 22. The front wall 16 is provided with an elongated slot or opening 24. The bag body 12 is also provided with gusseted side walls 26 and 28.

The air tunnel 14 is in the form of an elongated tube 30, having a front wall 32, a rear wall 34, and the gusseted side walls 36 and 38. The tubular body 30 is open at one end thereof as at 40 and the other end 42 thereof is closed within the end closure 20 of the bag body 12. The rear wall 34 of the tubular body 30 is provided also with an elongated slot or opening 44 which is substantially coextensive with the slot 24 in the bag body and which is in registry therewith, the conduit wall 34 being secured to the bag wall 16.

In operation, the filter bag 10 is inserted within the vacuum cleaner tank 46 and the air inlet conduit 48 of the vacuum cleaner has its outlet end inserted into the open end 40 of the air tunnel 14. Consequently, the dirt laden air enters the air inlet conduit 48 as indicated by the arrow 50, passing upwardly therethrough as indicated by the arrow 52 into the air tunnel or passageway 14. The dirt laden air then travels upwardly through the tunnel 14 and then passes through the aligned slots 24 and 44 as indicated by the arrow 54, passing then into the bag body 12 as indicated by the arrow 56, the dust being then retained within the bag body and the air passing through the bag body in conventional manner.

In order to manufacture the filter bag 10, there is provided an elongated tube 60 which is formed of preferably filter paper sheet material. The elongated tube 60 has a front wall 16A, a rear wall 18A, and the gusseted side walls 26A and 28A. The front wall 16A is provided with the elongated slots 24A which are formed at spaced intervals longitudinally thereof.

Provision is also made for a second supply of an elongated tube 62 preferably formed of paper sheet material which is impervious to air. The tube 62 is provided with a front wall 32A and with a rear wall 34A. In addition, tube 62 is provided with gusseted end walls 36A and 38A. Rear wall 34A of the elongated tube material 62 is provided at spaced intervals longitudinally thereof with elongated slots 44A, it being understood that the slots 44A are substantially equal in dimension to the slots 24A and that the spacing of the slots 44A longitudinally of the tube 62 is substantially equal to the spacing of the slots 24A longitudinally of the tube 60.

The tube 60 is withdrawn from the supply thereof (not illustrated) in the direction of the arrow 64 by conventional paper bag making machinery with the wall 16A thereof uppermost. Similarly, the tube 62 is withdrawn from a supply thereof (not illustrated) in the direction of the arrow 66 by conventional paper bag making machinery, with the wall 32A thereof uppermost. During the movement of the tube 60 from the supply thereof, conventional means are provided to apply a stripe of adhesive material 68 along each side of each slot 24A, the adhesive stripes therefore straddling each slot 24A and being provided on the outer surface of the front wall 16A of the tube 60 as best shown in FIG. 1. As the tube 62 is withdrawn from its supply it is positioned to overlie the tube 60 and positioned thereon so that each slot 44A will be in registry with an underlying slot 24A defined in the tube 60 and suitable means of conventional operation are provided to press the tube 62 against the tube 60, as indicated for example by the arrows 70 so as to seal the tubes 62 and 60 together, namely the rear wall 34A of the tube 62 being secured to the front wall 16A of the tube 60 along the adhesive stripe 68 provided at each side of each slot 24A defined in the tube 60 so that each slot 44A of the tube 62 will be sealed in registry with each slot 24A.

In the next succeeding step of the present invention, the secured together tubes are cut off at their leading ends as indicated by the arrow 72 so as to provide a tubular section 60A to which there is secured an equal length tubular section 62A, the sections being only partially secured together along the adhesive strips 68 so as to provide the combined tubular segments generally indicated by the reference numeral 74. As each segment 74 continues to move in the direction of the arrow 76 the leading end of each segment 74 is rolled up and secured in conventional manner to provide the end closure 20A which closes and seals both leading end of the cut-off segment of the tube 60A as well as the cut-off tube segment of 62A by turning up and rolling over said leading end as indicated by the arrow 78 in FIG. 3.

As previously indicated, in the segment 74, the cut-off portion 62A of the tube 62 is secured to the cut-off portion 60A of the tube 60 only along the adhesive stripes 68 which straddle the slots 24A and 34A which are disposed in registry. Consequently, there is an unsecured portion 80 of the tubular section 62A. In the next step of the method pursuant to the present invention, the unsecured portion 80 of the tubular segment 62A is moved upwardly from the underlying segment 60A of the tube 60 as best illustrated in FIG. 4. Thereafter, the trailing end 82 is rolled down and adhesively secured as indicated at 22A in FIG. 4. This now closes both ends of the tubular segment 60A. The tubular segment 62A was originally longitudinally coextensive with the tubular segment 60A and since the trailing end of the segment 62A was not rolled or shortened in any manner, it will be noted from FIG. 7 that in the finished filter bag 10, the open end 40 of the air inlet tunnel 32 extends beyond the closed end 22 of the bag body 12.

From the foregoing, it will be apparent that each cut-off segment 74 is formed into a filter bag 10 by closing the leading edge of each segment 60A and 62A and closing only the trailing edge of each segment 60A. Each of the foregoing steps pursuant to the present invention is accomplished by conventional paper bag making machinery in purely automatic fashion.

It will be understood that various changes and modifications may be made within the present invention without however departing from the basic inventive concept thereof as set forth in the appended claims.

I claim:
1. The method of forming a vacuum cleaner filter bag comprising providing a first elongated tubular segment of filter material having a slot defined in one surface thereof inwardly of the opposite ends of said segment, providing a second elongated tubular segment of air impervious material equal in longitudinal extent to said first segment and having a slot defined in one surface thereof inwardly of the opposite ends of said second segment, disposing said slots in registry, securing said surfaces together only along said slots, closing the leading ends of said segments, and closing the trailing end of said first segment.

2. The method as in claim 1, wherein said leading ends are closed by bending and securing them together.

3. The method as in claim 2, wherein the trailing end of said first segment is closed by first moving the trailing end of said second segment away from the trailing end of said first segment and then bending and securing the trailing end of said first segment.

4. The method of forming a vacuum cleaner filter bag comprising providing a first elongated tube of filter material having front and rear walls interconnected by opposing side walls, said front wall having elongated slots defined therein and spaced longitudinally thereof, providing a second elongated tube of air-impervious material having front and rear walls interconnected by opposing side walls, said rear wall of said second tube having elongated slots defined therein substantially coextensive with said first slots and substantially similarly spaced, disposing the rear wall of said second tube in contact with the front wall of said first tube so that the leading slots of said tubes are in registry, securing said tubes together only along the registering slots thereof, closing the leading ends of said tubes, cutting said tubes rearwardly of said leading slots, and closing the trailing end of the segment of said first tube which has been cut therefrom.

5. The method as in claim 4, wherein said leading ends are closed by bending and securing them together.

6. The method as in claim 4, wherein said trailing end is closed by first moving away therefrom the trailing end of the segment of said second tube which has been cut therefrom and then bending and securing the trailing end of said first mentioned segment.

No references cited.

FRANK E. BAILEY, *Primary Examiner.*